(12) United States Patent
Harnemo (10) Patent No.: US 11,686,235 B2
(45) Date of Patent: Jun. 27, 2023

(54) CONTROL OF PRE-SCR AMMONIA DOSING BASED ON LOOK-AHEAD DATA

(71) Applicant: Scania CV AB, Sodertalje (SE)

(72) Inventor: Björn Harnemo, Nykvarn (SE)

(73) Assignee: Scania CV AB, Södertälje (SE)

(*) Notice: Subject to any disclaimer, the term of this patent is extended or adjusted under 35 U.S.C. 154(b) by 0 days.

(21) Appl. No.: 17/278,749

(22) PCT Filed: Sep. 17, 2019

(86) PCT No.: PCT/SE2019/050873
§ 371 (c)(1),
(2) Date: Mar. 23, 2021

(87) PCT Pub. No.: WO2020/071981
PCT Pub. Date: Apr. 9, 2020

(65) Prior Publication Data
US 2022/0034249 A1    Feb. 3, 2022

(30) Foreign Application Priority Data
Oct. 4, 2018    (SE) .................... 1851196-4

(51) Int. Cl.
*F01N 3/20*    (2006.01)
*F01N 3/08*    (2006.01)
*F01N 3/035*   (2006.01)

(52) U.S. Cl.
CPC ......... *F01N 3/2073* (2013.01); *F01N 3/0814* (2013.01); *F01N 3/208* (2013.01); *F01N 3/2066* (2013.01); *F01N 3/035* (2013.01)

(58) Field of Classification Search
CPC ...... F01N 3/2073; F01N 3/0814; F01N 3/208; F01N 3/2066; F01N 3/035; F01N 3/18;
(Continued)

(56) References Cited

U.S. PATENT DOCUMENTS

2009/0035194 A1    2/2009    Robel et al. ............... 422/177
2012/0167555 A1    7/2012    Frazier ....................... 60/274
(Continued)

FOREIGN PATENT DOCUMENTS

CN    101617109 B    8/2012
CN    104053871 A    9/2014
(Continued)

OTHER PUBLICATIONS

Novelty Search Report dated Feb. 16, 2018.
Office Action dated Mar. 14, 2019 in corresponding Swedish Patent Application No. 1851196-4.
International Search Report dated Nov. 13, 2019 in corresponding PCT International Application No. PCT/SE2019/050873.
(Continued)

Primary Examiner — Carl C Staubach
Assistant Examiner — Diem T Tran
(74) Attorney, Agent, or Firm — Banner & Witcoff, Ltd.

(57) ABSTRACT

A method for controlling an exhaust gas aftertreatment system, wherein the system includes a first selective catalytic reduction (SCR) device, a catalytic particulate filter arrangement arranged downstream of the first SCR device, and a second selective catalytic reduction (SCR) device arranged downstream of the catalytic particulate filter arrangement. The method includes estimating future exhaust conditions based upon predicted vehicle operating conditions (s403); —estimating a future NOx conversion demand based on the estimated future exhaust conditions (s405); —dosing a reducing agent from a first reducing agent dosing device at a rate based at least on the estimated future NOx conversion demand (s406).

12 Claims, 7 Drawing Sheets

(58) Field of Classification Search
CPC ............... F01N 13/009; F01N 13/0093; F01N 2260/40; F01N 2560/026; F01N 2610/02; F01N 2900/102; F01N 2900/1402; F01N 2900/1621; F01N 2900/1622; F01N 3/21; F01N 3/023; F01N 3/0231; F01N 3/20; F01N 9/005; Y02A 50/20; Y02T 10/12; Y02T 10/40

See application file for complete search history.

(56) References Cited

U.S. PATENT DOCUMENTS

| | | |
|---|---|---|
| 2015/0204226 A1 | 7/2015 | Moore |
| 2015/0275730 A1 | 10/2015 | Gupta et al. |
| 2017/0030243 A1 | 2/2017 | Li et al. |
| 2018/0230877 A1 | 8/2018 | Nilsson |

FOREIGN PATENT DOCUMENTS

| | | |
|---|---|---|
| CN | 107849957 A | 3/2018 |
| CN | 107923280 A | 4/2018 |
| DE | 10 2014 216 217 A1 | 2/2016 |
| DE | 10 2015 218 776 A1 | 3/2017 |
| DE | 10 2016 014 854 A1 | 7/2017 |
| WO | 2013095214 A1 | 6/2013 |
| WO | WO 2015/130211 A1 | 9/2015 |
| WO | 2015179720 A1 | 11/2015 |

OTHER PUBLICATIONS

Written Opinion dated Nov. 13, 2019 in corresponding PCT International Application No. PCT/SE2019/050873.

May 27, 2022—(EP) Extended Search Report—App. No. 19869598.3.

Mar. 3, 2022—(CN) First Office Action—App. No. 201980063460.X.

Fig. 6a (comparative)

Fig. 6b (comparative)

CONTROL OF PRE-SCR AMMONIA DOSING BASED ON LOOK-AHEAD DATA

CROSS-REFERENCE TO RELATED APPLICATIONS

The present application is a 35 U.S.C. §§ 371 national phase conversion of PCT/SE2019/050873, filed Sep. 17, 2019, the contents of which are incorporated herein by reference, which claims priority of Swedish Patent Application No. 1851196-4 filed Oct. 4, 2018, the contents of which are incorporated by reference herein. The PCT International Application was published in the English language.

TECHNICAL FIELD

The present invention relates to a method for controlling an exhaust gas aftertreatment system and to an exhaust gas aftertreatment system arranged to perform such a method, a vehicle comprising such an aftertreatment system, a computer program causing a control unit to perform the method, and a computer-readable medium comprising instructions to cause a control unit to perform the method.

BACKGROUND ART

Emissions standards for motor vehicles are becoming increasingly stringent. Such standards typically specify maximum emission levels for a number of tailpipe pollutants including carbon monoxide (CO), hydrocarbons (HC), nitrogen oxides (NOx) and particulate matter (PM). In order to meet the requirements of the present and presumably future standards, vehicles are required to be equipped with emissions reduction technologies. Such emissions reduction technologies suitable for diesel vehicles include exhaust gas recirculation (EGR), particulate filters, diesel oxidation catalysts (DOC), and selective catalytic reduction (SCR). Each technology has its own distinct advantages and disadvantages, and may increase the incidence of one pollutant while reducing the incidence of another. For example, EGR may reduce NOx emissions, but reduce fuel efficiency and increase particulate matter. Therefore, a number of technologies are commonly applied together in order to meet emissions standards.

Selective catalytic reduction (SCR) is an effective technology to reduce tailpipe nitrogen oxides (NOx) emissions. It involves adding a reductant, such as ammonia, to the vehicle exhaust stream. The reductant, with the aid of a catalyst, reduces NOx in the exhaust stream to nitrogen gas ($N_2$) and water. In practical implementations in motor vehicles, an aqueous urea solution is used as a reductant and this urea solution is decomposed to ammonia and carbon dioxide in the hot exhaust stream.

Since SCR is implemented downstream of the engine as an exhaust aftertreatment, it does not affect the combustion performance of the engine in the same manner as for example EGR does. Therefore, it is desirable to be able to remove substantially all NOx from the exhaust stream using only SCR, without the need for EGR. However, this is not achieved without difficulties, since in order to remove substantially all NOx, the SCR system must be dimensioned to facilitate the production of large quantities of ammonia from urea solution and to provide sufficient catalytic sites for this ammonia to be able to reduce the tailpipe NOx. A non-optimally dimensioned SCR system may lead to problems such as insufficient temperatures for decomposition of the urea solution, insufficient mixing of reductant in the exhaust flow and ultimately to both ammonia slip and/or insufficient reduction of tailpipe NOx.

The use of exhaust aftertreatment systems comprising two separate SCR catalysts has been proposed in order to assist in the challenge of dimensioning a suitable SCR system. For example, WO 2015130211 describes an exhaust treatment system comprising a first reduction catalyst device, a catalysed particulate filter arranged downstream of the first reduction catalyst device, and a second reduction catalyst device, arranged downstream of the particulate filter.

There remains a need for an improved means for treating exhaust tailpipe emissions.

SUMMARY OF THE INVENTION

The inventor of the present invention has recognised that in a sequential SCR system with an SCR catalyst (the pre-SCR) mounted before a catalysed particulate filter (cDPF) arrangement, the NOx-reduction in the pre-SCR may need to be limited so that the cDPF is supplied with high levels of NOx in order to facilitate a high rate of passive regeneration. This is because the cDPF catalyst oxidizes NOx to $NO_2$ which in turn oxidizes soot at comparatively low temperatures (as compared to oxygen as the soot oxidant). If insufficient rates of passive soot oxidation are achieved, active regeneration of the cDPF may be required, which may reduce fuel economy and/or require the provision of alternative heating sources in the DPF housing. The inventor has recognised that in order for low NOx conversion at the pre-SCR, the pre-SCR ammonia storage must be kept low. This however stands in conflict with the need for high pre-SCR NOx conversion during some transient engine conditions in order to adequately remove NOx from the exhaust stream. Increasing ammonia dosing to the SCR catalysts upon detection of such a transient may often be insufficient to meet the required sharp increase in NOx conversion demand in the SCR system. This is because the ammonia storage of the SCR catalysts must first be increased before a corresponding increase in the catalyst conversion capacity is obtained, i.e. the conversion capacity for each catalyst lags with respect to dosing. It may take in the order of tens of seconds for an increase in ammonia dosed to an SCR catalyst to provide the expected increase in NOx conversion. This lag means that with low ammonia dosing to the pre-SCR, which is favorable from a passive regeneration perspective, the aftertreatment system as a whole may not be able to adequately respond to sudden or sharp increases in NOx conversion demand.

It would be advantageous to achieve an exhaust aftertreatment system overcoming, or at least alleviating, at least some of the above mentioned challenges. In particular, it would be desirable to provide an exhaust aftertreatment system allowing for passive regeneration of the cDPF while still enabling sufficient removal of exhaust NOx, even under challenging operating conditions. To better address one or more of these concerns, an exhaust gas aftertreatment system and method for controlling such a system are provided.

According to a first aspect of the invention, the object of the invention is achieved by a method disclosed herein for controlling an exhaust gas aftertreatment system.

The exhaust gas aftertreatment system comprises
a first reducing agent dosing device;
a first selective catalytic reduction (SCR) device arranged downstream of the first reducing agent dosing device; and a catalytic particulate filter arrangement arranged downstream of the first SCR device, wherein the catalytic particulate filter assembly comprises a catalysed particulate filter, or wherein the catalytic particulate filter assembly comprises an oxidation catalyst and a particulate filter arranged downstream of the oxidation catalyst;

a second reducing agent dosing device arranged downstream of the catalytic particulate filter arrangement; and a second selective catalytic reduction (SCR) device arranged downstream of the second reducing agent dosing device.

The method for controlling the exhaust gas aftertreatment system comprises the steps of:

estimating future exhaust conditions based upon predicted vehicle operating conditions;

estimating a future NOx conversion demand based on the estimated future exhaust conditions; and dosing a reducing agent from the first reducing agent dosing device at a rate based at least on the estimated future NOx conversion demand.

By estimating the future engine exhaust conditions (e.g. as catalyst space velocity, temperature and/or NOx-flow) derived from predicted vehicle operating conditions (i.e. "look-ahead"-data), a future NOx conversion demand may be estimated. This estimated future NOx conversion demand is used as the basis for the dosing rate from the first reducing agent dosing device. In this way, the amount of reducing agent stored in the first (pre-) SCR device can be optimized, consequently allowing the amount of NOx-conversion in the first SCR to be optimized with regard to passive soot oxidation. Reducing agent dosing to the first SCR catalyst can be controlled using predicted vehicle operating conditions to ensure that the aftertreatment system is capable of removing substantially all NOx from the exhaust stream, even during sudden increases in NOx conversion demand, whilst ensuring a flow of NOx to the catalytic particulate filter arrangement sufficient to ensure a suitable degree of passive regeneration.

The step of dosing a reducing agent from the first reducing agent dosing device at a rate based at least on the estimated future NOx conversion demand may comprise:

comparing the estimated future NOx conversion demand with a predetermined first threshold limit for NOx conversion demand; and dosing a reducing agent from the first reducing agent dosing device, wherein if the estimated future NOx conversion demand is within the first threshold limit, then the reducing agent is dosed at a predetermined baseline rate; and if the estimated future NOx conversion demand is beyond the first threshold limit, then the reducing agent is dosed at an adapted rate, wherein the adapted rate differs from the baseline rate.

The first threshold limit may be an upper threshold limit and the adapted rate may then be an elevated rate that is higher than the baseline rate, such as at least 10% higher than the baseline rate. This means that a baseline rate may be used that allows sufficient NOx downstream of the first SCR device such that passive regeneration of the catalytic particulate filter (cDPF) may be achieved during normal operation. If a limited event demanding high NOx conversion in the first SCR device is predicted, the first SCR device can be "primed", i.e. the ammonia storage of the first SCR device can be pre-emptively increased, by temporarily dosing at an elevated rate. The impact on soot oxidation (passive regeneration) in the cDPF can be neglected as this is a limited event. When the event is completed, and the need for high pre-SCR NOx conversion decreases, the dosing rate is returned to a baseline level which again provides the preferred exhaust composition for the cDPF.

The method may further comprise comparing the estimated future NOx conversion demand with a predetermined lower threshold limit for NOx conversion demand, wherein if the estimated future NOx conversion demand is beyond the lower threshold limit, then a reducing agent is dosed at a lower rate from the first reducing agent dosing device. Alternatively, the first threshold limit may be a lower threshold limit, and the adapted rate may then be a lower rate, i.e. there may be no upper threshold limit. The lower rate is lower than the baseline rate, such as at least 10% lower than the baseline rate. This results in the first SCR device decreasing NOx conversion during periods of relatively low total NOx conversion demand, and thus allows higher levels of NOx through to the cDPF arrangement and greater passive regeneration of the cDPF, while not jeopardizing the NOx conversion efficiency of the aftertreatment system as a whole.

The baseline rate may be adapted to correspond to from 20% to 60% of estimated future NOx conversion demand. The elevated rate may be adapted to correspond to from 60% to 90% of estimated future NOx conversion demand. The lower rate may adapted to correspond to from 0% to 30% of estimated future NOx conversion demand. Such rates may assist in maintaining a sufficient degree of passive regeneration of the cDPF arrangement while ensuring that the aftertreatment system meets the required total NOx conversion capacity.

The elevated rate and/or the lower rate may vary based at least partially on the estimated future NOx conversion demand. For example, the elevated rate and/or the lower rate may vary stepwise or proportionally to the estimated future NOx conversion demand. This may allow a greater degree of control over the total NOx conversion capacity and passive regeneration of the cDPF.

A reducing agent may be dosed from the second reducing agent dosing device at a rate based at least partially on the estimated future NOx conversion demand. This may allow the aftertreatment system to better address sudden or rapid changes in the required NOx conversion capacity.

The exhaust gas aftertreatment system may further comprise a NOx sensor, for example a NOx sensor arranged downstream of the catalytic particulate filter arrangement and upstream of the second reducing agent dosing device. A reducing agent may then be dosed from the first and/or second reducing agent dosing device at a rate based at least partially on a value provided by the NOx sensor. This may allow a more exact dosing of the reducing agent to the first and/or second SCR devices, thus potentially preventing or decreasing slip of the reducing agent beyond the first and/or second SCR devices (i.e. ammonia slip). This in turn may lead to a lessened need for a slip catalyst downstream of the first and/or second SCR device, i.e. the slip catalysts may for example be downsized, have a lower proportion of catalytic metals in the washcoat, or in some cases be avoided completely.

The predicted vehicle operating conditions may be based on information from at least one of an engine management system of the internal combustion engine, a gearbox management system, a navigation system, a cruise control system and/or a radar system configured to determine traffic conditions. Such systems are commonly incorporated in modern vehicles and each may be used in isolation or in combination with other systems in order to provide useful predictions of future operating conditions upon which estimates of a future NOx conversion demand may be based.

According to a further aspect of the invention, the object of the invention is achieved by an exhaust gas aftertreatment system according to the invention.

The exhaust gas aftertreatment system comprises:
a first reducing agent dosing device;
a first selective catalytic reduction (SCR) device arranged downstream of the first reducing agent dosing device;
a catalytic particulate filter arrangement arranged downstream of the first SCR device, wherein the catalytic particulate filter assembly comprises a catalysed particulate filter, or wherein the catalytic particulate filter assembly comprises an oxidation catalyst and a particulate filter arranged downstream of the oxidation catalyst;
a second reducing agent dosing device arranged downstream of the catalytic particulate filter arrangement;
a second selective catalytic reduction (SCR) device arranged downstream of the second reducing agent dosing device;
a means arranged to estimate future exhaust conditions based upon predicted vehicle operating conditions; and
a means arranged to estimate a future NOx conversion demand based on the estimated future exhaust conditions;
wherein the exhaust gas aftertreatment system is arranged to dose a reducing agent from the first reducing agent dosing device based at least on the estimated future NOx conversion demand.

The advantages of such an exhaust aftertreatment system are the same as discussed herein in conjunction with the disclosed method for controlling an exhaust gas aftertreatment system.

The exhaust gas aftertreatment system may further comprise:
a means arranged to compare the estimated future NOx conversion demand with a predetermined first threshold limit for NOx conversion demand;
wherein the exhaust gas aftertreatment system is arranged to dose a reducing agent from the first reducing agent dosing device at a predetermined baseline rate if the estimated future NOx conversion demand is within the first threshold limit;
and wherein the exhaust gas aftertreatment system is arranged to dose a reducing agent from the first reducing agent dosing device at an adapted rate if the estimated future NOx conversion demand is beyond the first threshold limit, wherein the adapted rate differs from the baseline rate.

A NOx sensor may be arranged in the exhaust aftertreatment system, for example downstream of the catalytic particulate filter arrangement and upstream of the second reducing agent dosing device. This allows a more exact dosing of the reducing agent to the second SCR device, thus potentially preventing or reducing slip of the reducing agent beyond the second SCR device (i.e. ammonia slip).

One or more slip catalysts may be arranged downstream of the first selective catalytic reduction (SCR) device and/or downstream of the second selective catalytic reduction (SCR) device. The slip catalyst(s) may for example be ammonia slip catalysts. The use of a slip catalyst allows for the use of a greater ratio of reducing agent to NOx, thus further decreasing tailpipe NOx emissions while helping to avoid tailpipe emission of the reducing agent.

According to another aspect of the invention, the object of the invention is achieved by a computer program. The computer program comprises program code for causing a control unit or a computer connected to the control unit to perform the method for controlling an exhaust gas aftertreatment system as disclosed herein.

According to yet a further aspect of the invention, the object of the invention is achieved by a computer-readable medium as disclosed herein. The computer-readable medium comprises instructions, which when executed by a control unit or a computer connected to the control unit cause the control unit or the computer to perform the method for controlling an exhaust gas aftertreatment system as disclosed herein.

Further objects, advantages and novel features of the present invention will become apparent to one skilled in the art from the following detailed description.

BRIEF DESCRIPTION OF THE DRAWINGS

For a fuller understanding of the present invention and further objects and advantages of it, the detailed description set out below should be read together with the accompanying drawings, in which the same reference notations denote similar items in the various diagrams, and in which.

DETAILED DESCRIPTION

The present invention concerns an exhaust gas aftertreatment system, as well as a method and means for controlling such an exhaust gas aftertreatment system.

The exhaust gas aftertreatment system comprises
a first reducing agent dosing device;
a first selective catalytic reduction (SCR) device arranged downstream of the first reducing agent dosing device;
a catalytic particulate filter (cDPF) arrangement arranged downstream of the first SCR device;

a second reducing agent dosing device arranged downstream of the catalytic particulate filter arrangement; and a second selective catalytic reduction (SCR) device arranged downstream of the second reducing agent dosing device.

Herein the terms "downstream" and "upstream" are used with reference to the general direction of exhaust flow, from the inlet of the exhaust gas aftertreatment system, via the first SCR device, cDPF arrangement and second SCR device, to the outlet of the exhaust gas aftertreatment system.

The first and second reducing agent dosing devices may be of any type known in the art. The dosing devices may for example be liquid-only devices, otherwise known as airless injectors. This means that the dosing devices do not utilize compressed air in order to facilitate injection of the reductant into the exhaust conduit. However, the dosing devices may alternatively be air-assisted, i.e. devices that utilize compressed air to facilitate injection of the reductant. The dosing device(s) may be components of a reductant dosing system. Further components of the reductant dosing system may include reductant storage tank(s), control unit(s), and pressurising device(s) such as pump(s).

The reducing agent is preferably diesel exhaust fluid comprising a solution of urea in water, in accordance with standard AUS 32 of ISO 22241 and sold commercially as "AdBlue". When dosed to the exhaust conduit, the reducing agent decomposes by hydrolysis and/or thermolysis to provide ammonia, which is the primary reductant in the SCR reaction. Herein, the terms "ammonia", "reductant" and "reducing agent" will be used interchangeably.

The first and second SCR devices may be any type of selective catalytic reduction catalysts known in the art. Selective catalytic reduction (SCR) is used to convert nitrogen oxides (NOx) to benign nitrogen gas ($N_2$) using ammonia as the reductant. The dominant reactions in SCR are:

$4NH_3 + 4NO + O_2 \rightarrow 4N_2 + 6H_2O$ $4NH_3 + 2NO_2 + 2NO \rightarrow 4N_2 + 6H_2)$ It can be seen from these reactions that the optimal stoichiometry of $NH_3$ to NOx is approximately 1:1. Sub-stoichiometric dosing of ammonia leads to incomplete conversion of NOx, whereas excess dosing of ammonia leads to ammonia slip. Since ammonia emissions are also regulated, ammonia slip is undesirable. In practice, due to non-uniform distribution of reducing agent in the exhaust stream, a slight excess of ammonia is required to remove substantially all NOx and ammonia slip occurs even at sub-stoichiometric dosing of reductant. Due to the use of two separate SCR devices, the total NOx conversion requirement may be shared between the two devices. Thus, for example, a lower share of NOx may be converted using the first SCR device.

The catalytic particulate filter assembly comprises a catalyzed particulate filter, or alternatively an oxidation catalyst and a particulate filter arranged downstream of the oxidation catalyst. The catalytic particulate filter may be of any type known in the art. The oxidation catalyst and/or catalytic coating of the particulate filter oxidize NO to $NO_2$. The formed $NO_2$, as well as any $NO_2$ already present in the exhaust stream, oxidizes soot deposited in the particulate filter to $CO_2$. This is known as passive regeneration since the particulate filter does not require any additional energy input in order to rid itself from soot. Passive regeneration of the particulate filter is highly desirable since it obviates the need for extra heating devices and avoids energy loss associated with active regeneration. However, in order for the passive regeneration mechanism to be effective it is incumbent that a suitable flow of NOx reaches the cDPF.

Therefore, in aftertreatment systems such as the ones described herein that employ an SCR device upstream of the cDPF arrangement, it is essential to ensure a suitably low NOx conversion at the first SCR device in order to achieve sufficient passive regeneration. However, this may in some instances conflict with the need for a high NOx conversion at the first SCR for some transient engine conditions, especially in cases where the total NOx conversion demand increases precipitously.

This problem is ameliorated by the method for controlling the exhaust gas aftertreatment system as disclosed herein. The method comprises the steps of:

estimating future exhaust conditions based upon predicted vehicle operating conditions;

estimating a future NOx conversion demand based on the estimated future exhaust conditions; and dosing a reducing agent from the first reducing agent dosing device at a rate based at least on the estimated future NOx conversion demand.

The terms "based on", "based at least on" and "based at least partially on" are to be interpreted as meaning that the dosing rate is controlled using at least as a factor in the control algorithm the parameter that the dosing rate is "based on", "based at least on" and "based at least partially on". The control algorithm may utilize solely the stated parameter, in this case estimated future NOx conversion demand. However, other parameters, such threshold limits or NOx sensor outputs may be taken into account by the control algorithm.

By controlling dosing to the first SCR device based on "look ahead" data it can be ensured that the aftertreatment system can handle temporary spikes in NOx production while ensuring a sufficient overall level of NOx to the cDPF arrangement in order to obtain sufficient passive regeneration. This can be done for example by controlling dosing from the first dosing device in order to allow a significant proportion of NOx to pass unconverted through the first SCR device and reach the cDFP arrangement whereby passive regeneration is obtained. Note that such a control strategy is only advantageous in a dual-SCR system where one of the SCR catalysts is upstream of the cDPF arrangement. In systems where all SCR catalysts are arranged downstream of the cDPF, the NOx conversion of the SCR catalysts does not impact the passive regeneration of the cDPF, whereas in systems utilizing single SCR catalysts, the dosing to the single SCR catalyst must inevitably be controlled to maximize NOx conversion in order to meet emission control standards.

When demanding operating conditions are predicted and an increased future NOx conversion demand is correspondingly estimated, the reducing agent may be dosed at an elevated rate from the first dosing device, thus "priming" the first SCR device for the coming NOx peak. This allows the quantity of ammonia stored in the first SCR device to be increased pre-emptively in order to increase the NOx conversion capacity of the first SCR device in adequate time. Merely to illustrate, the full increase in the NOx conversion capacity may typically be obtained first tens of seconds after the elevated dosing rate has been initiated. Thus, utilizing the method according to the invention, when the NOx peak arrives, there is no lag in responding to the peak and the aftertreatment system as a whole may therefore effectively handle such peaks in NOx production. It should also be noted that the NOx conversion as a function of stored ammonia is non-linear and it may for example require a factor of about 10 times more stored ammonia in an SCR catalyst to increase NOx conversion from 40% to 60%. For this reason, pre-emptive increase in the ammonia storage of the first SCR device is extremely advantageous in meeting suddenly increase NOx conversion demands.

The elevated rate of dosing to the first SCR may temporarily result in that the NOx amount is passing to the cDPF is sub-optimal for passive regeneration, but since this is a limited event, the impact on soot oxidation can be neglected. When the event is completed, and the need for high pre-SCR NOx conversion decreases, the dosing to the first SCR device may be returned to the baseline rate which again provides the preferred exhaust composition for passive regeneration of the cDPF. Alternatively, a baseline rate can be chosen which is less than optimal for passive regeneration but allows even the greatest NOx conversion demands to be met. When non-demanding operating conditions are predicted and a reduced future NOx conversion demand is estimated, the reducing agent may then be dosed at a lower rate from the first dosing device in order to allow for a period of passive regeneration. Naturally, both of these scenarios may be combined by having both an upper and lower threshold limit. A further advantage of using predictive data to control dosing to the first SCR device is that it may obviate the need for a NOx sensor upstream of the first dosing device, which otherwise is commonly used in such systems.

Future exhaust conditions are estimated based on predicted vehicle operating conditions. The predicted vehicle operating conditions, also known as "look-ahead" data, may be obtained from one or more electronic control units of the vehicle, including but not limited to an engine management system of the internal combustion engine (aka. engine control unit), a gearbox management system (aka. transmission control unit), a navigation system (aka. telematic control unit), a cruise control system (aka. speed control unit) and/or a radar system configured to determine traffic conditions. Relevant future scenarios predictable from such control systems may for example be an upcoming steep incline or decline, heavy traffic ahead, or an upcoming change in speed limits. Relevant future exhaust conditions that may be estimated based upon the predicted operating conditions include inlet exhaust temperature, volumetric flow, catalyst space time/velocity (for each of the catalytic components present in the aftertreatment system if required), and inlet total NOx flow.

From these future exhaust conditions, a future NOx conversion demand is estimated, this being a total NOx conversion demand over both the first and second SCR devices. Based upon this predicted conversion demand, a dosing strategy for at least the first dosing device and first SCR device is devised. In some embodiments of the invention, the predicted demand is compared to at least one threshold limit for NOx conversion demand. This threshold may for example be an upper threshold or a lower threshold. This may be performed using the method steps:

comparing the estimated future NOx conversion demand with a predetermined first threshold limit for NOx conversion demand; and dosing a reducing agent from the first reducing agent dosing device, wherein if the estimated future NOx conversion demand is within the first threshold limit, then the reducing agent is dosed at a predetermined baseline rate; and if the estimated future NOx conversion demand is beyond the first threshold limit, then the reducing agent is dosed at an adapted rate, wherein the adapted rate differs from the baseline rate.

If the estimated future NOx conversion demand is within the first threshold limit, then the reducing agent may be dosed at a predetermined baseline rate. By within the threshold limit it is meant below an upper threshold limit, above a lower threshold limit, or within the range bounded by the upper and lower threshold limits if both an upper and lower threshold limit is used. The baseline rate may be expressed as a mass flow rate or volume flow rate of reducing agent dosed from the first dosing device. Alternatively, the baseline rate may be expressed as a proportion of the total NOx conversion demand, for example 50% of the total NOx conversion demand. In such a case, the mass or volumetric flow rate of reducing agent dosed from the first dosing device may vary proportionally with the total NOx conversion demand, although the baseline rate remains unaltered. The total NOx conversion demand that the baseline rate is based on may be the estimated future NOx conversion demand or a NOx conversion demand obtained from a NOx sensor, such as for example a NOx sensor arranged upstream of the first SCR device, if available.

If the estimated future NOx conversion demand is beyond the first threshold limit, then the reducing agent may be dosed at an adapted rate. By beyond the threshold limit it is meant above an upper threshold limit or below a lower threshold limit. The adapted rate differs from the baseline rate and is typically higher than the baseline rate when the estimated future NOx conversion demand is higher than an upper threshold limit, and lower than the baseline rate when the estimated future NOx conversion demand is lower than an lower threshold limit. The adapted rate is expressed in the same units as the baseline rate, i.e. as a mass flow rate, volumetric flow rate, or proportion of total NOx conversion demand. The adapted rate may also be chosen to vary based at least partially on the estimated future NOx conversion demand. The adapted rate may vary continuously or stepwise. For example, if the estimated NOx conversion demand is proximately above an upper threshold limit, the adapted rate may be 1.5 times the baseline rate, whereas if the estimated NOx conversion demand is far in excess of the upper threshold limit then an adapted rate of for example 5 times the baseline rate may be used.

Typically, the baseline rate of dosing from the first dosing device corresponds to from about 20% to about 60% of estimated future NOx conversion demand. The elevated dosing rate is at least 10% higher than the baseline rate, such as at least 30% higher or at least 50% higher, and typically corresponds to from about 60% to about 90% of estimated future NOx conversion demand. The lower dosing rate is at least 10% lower than the baseline rate, such as at least 30% lower or at least 50% lower, and typically corresponds to from 0% to 30% of estimated future NOx conversion demand.

The method may employ multiple threshold limits. For example, the method may use an upper threshold limit above which an elevated dosing rate is used and a lower threshold limit below which a lower dosing rate is used. Multiple upper or lower limits may also be used, so that for example above a first upper threshold limit, but below a second upper threshold limit, a first elevated dosing rate is used and above the second upper threshold limit a second elevated dosing rate is used which is greater than the first elevated dosing rate.

Dosing from the second reducing agent dosing device may also be based at least partially on the estimated future NOx conversion demand. However, it is preferable to control dosing from the second reducing agent dosing device primarily based upon a signal from one or more NOx sensors located in the exhaust aftertreatment system. Such NOx sensors may for example be located downstream of the catalytic particulate filter arrangement and upstream of the second dosing device, upstream of the first dosing device, or downstream of the second SCR device. This provides exact control of the ammonia NOx ration in the second SCR device and helps prevent excessive ammonia slip or tailpipe NOx emission.

The exhaust gas aftertreatment system may comprise means for performing the method described herein. That is to say that the exhaust gas aftertreatment system may comprise:
- a means arranged to estimate future exhaust conditions based upon predicted vehicle operating conditions;
- a means arranged to estimate a future NOx conversion demand based on the estimated future exhaust conditions; and
- a means arranged to compare the estimated future NOx conversion demand with a predetermined first threshold limit for NOx conversion demand;
- wherein the exhaust gas aftertreatment system is arranged to dose a reducing agent from the first reducing agent dosing device at a predetermined baseline rate if the estimated future NOx conversion demand is within the first threshold limit;
- and wherein the exhaust gas aftertreatment system is arranged to dose a reducing agent from the first reducing agent dosing device at an adapted rate if the estimated future NOx conversion demand is beyond the first threshold limit, wherein the adapted rate differs from the baseline rate.

Such means may for example be one or more control units programmed to perform the method. However, the method may also be implemented by means separate from the exhaust gas aftertreatment system, such as by using an electronic control unit (ECU) embedded elsewhere in the vehicle and connected to the exhaust gas aftertreatment system as required.

The exhaust gas aftertreatment system may comprise further components as known in the art. Besides NOx sensors upstream of the first and/or second SCR devices as already described, further components may include ammonia slip catalysts immediately downstream of the first and/or second SCR device. Use of an ammonia slip catalyst in conjunction with the first SCR device prevents ammonia reaching the catalytic particulate filter where it could potentially be non-selectively oxidized to NOx. Use of an ammonia slip catalyst in conjunction with the second SCR device allows for a more complete removal of NOx from the exhaust stream while helping avoid tailpipe ammonia emissions.

The invention will now be described in more detail with reference to certain exemplifying embodiments and the drawings. However, the invention is not limited to the exemplifying embodiments discussed herein and/or shown in the drawings, but may be varied within the scope of the appended claims. Furthermore, the drawings shall not be considered drawn to scale as some features may be exaggerated in order to more clearly illustrate certain features.

Figure 1:
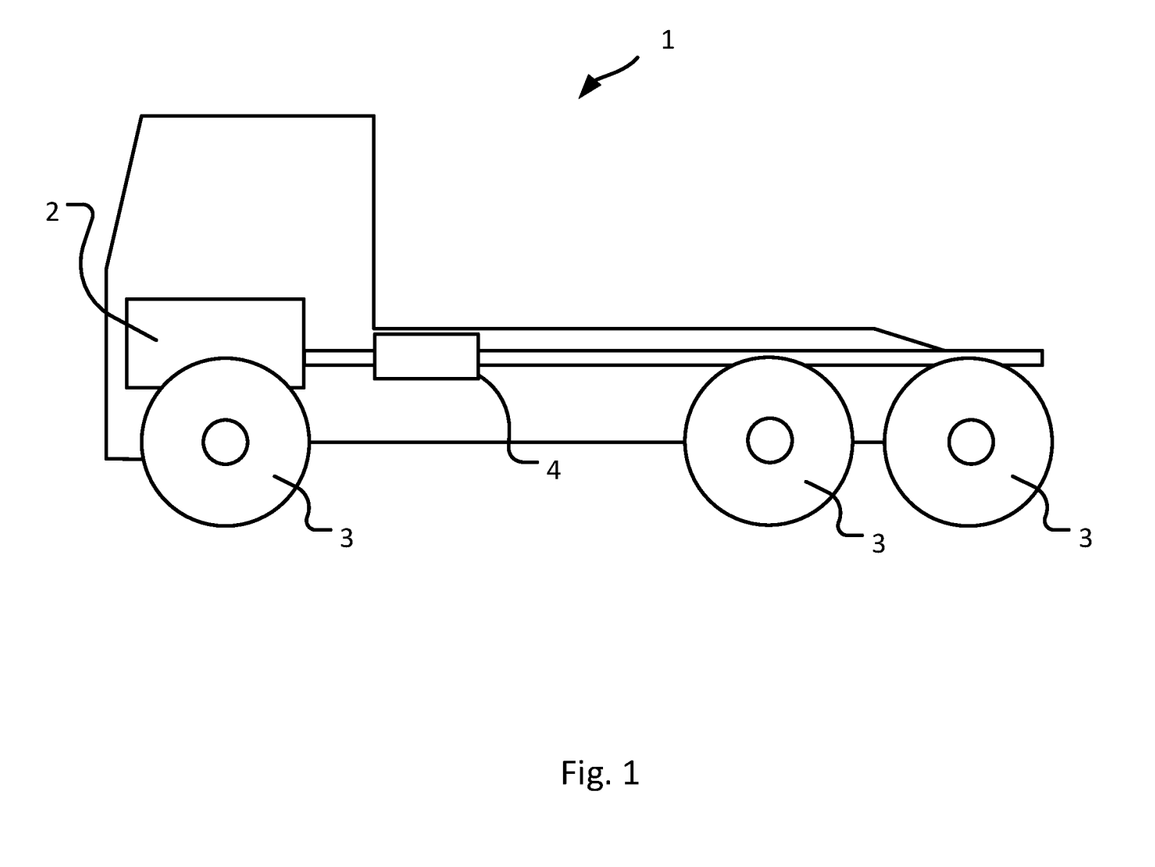
FIG. 1 schematically illustrates a vehicle comprising an exhaust aftertreatment system.

FIG. 1 depicts a vehicle 1, here in the form of a truck, in a schematic side view. The vehicle may however be any other motor driven vehicle, for example a bus, a watercraft, or a passenger car. The vehicle comprises a combustion engine 2 which powers the vehicle's tractive wheels 3 via a gearbox (not shown) and a drive shaft (not shown). The vehicle is provided with an exhaust gas aftertreatment system 4 for treating exhaust gases expelled by the engine 2.

Figure 2:
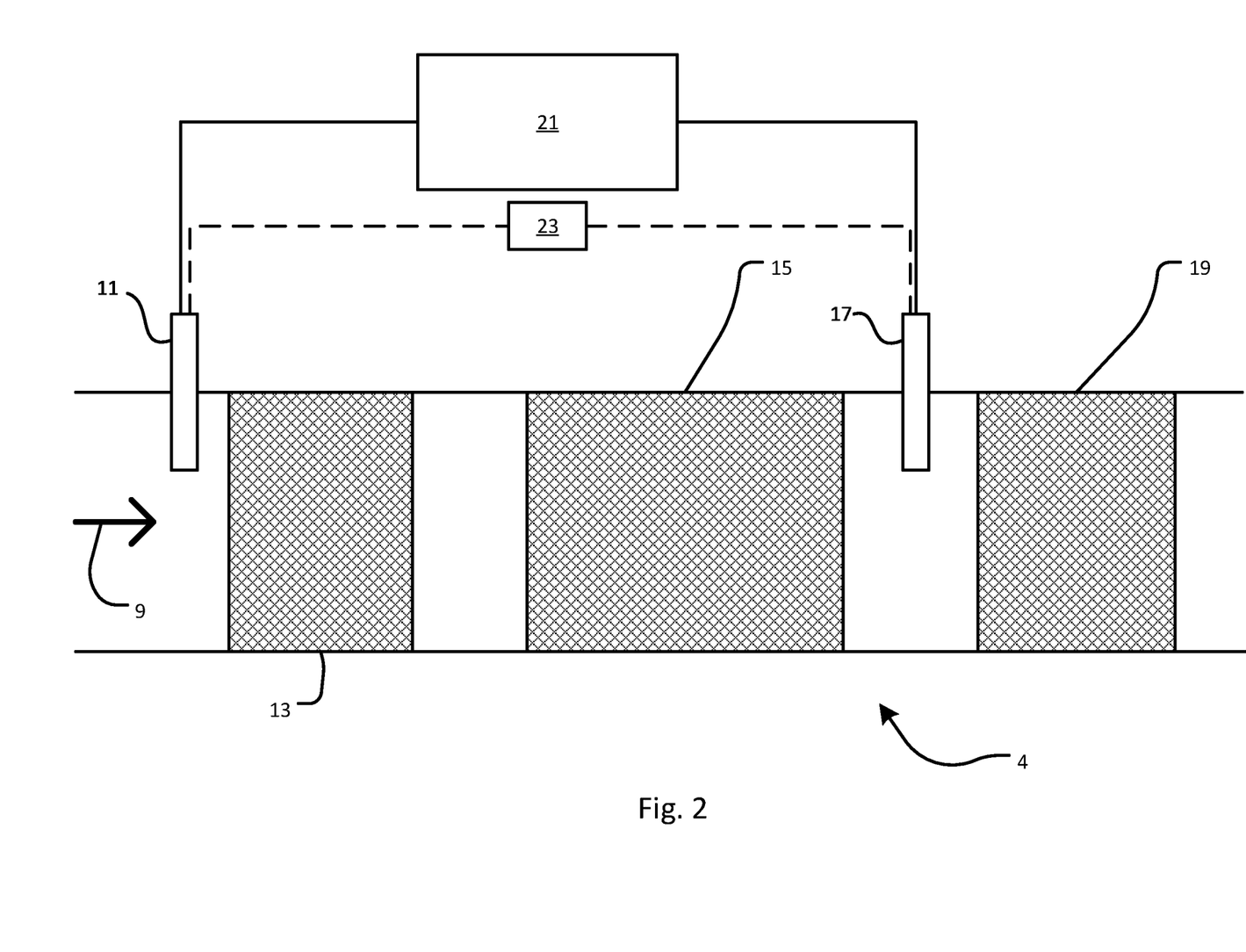
FIG. 2 schematically illustrates an embodiment of an exhaust gas aftertreatment system according to the invention.

FIG. 2 schematically illustrates one exemplifying embodiment of an exhaust gas aftertreatment system 4 according to the present invention. An arrow 9 indicates the direction of exhaust flow. The terms "downstream" and "upstream" are used with reference to the direction of exhaust flow. The system comprises a first reducing agent dosing device 11, a first SCR device 13, a catalytic particulate filter arrangement 15, a second reducing agent dosing device 17 and a second SCR device 19. The first and second dosing devices 11, 17 are in fluid connection with a reducing agent storage tank 21. Electronic control unit 23 controls dosing of reducing agent from the dosing devices 11, 17. In this embodiment the catalytic particulate filter arrangement 15 is represented by a catalyzed particulate filter whereby the surface of the filter is coated with a catalytic washcoat.

Figure 3:
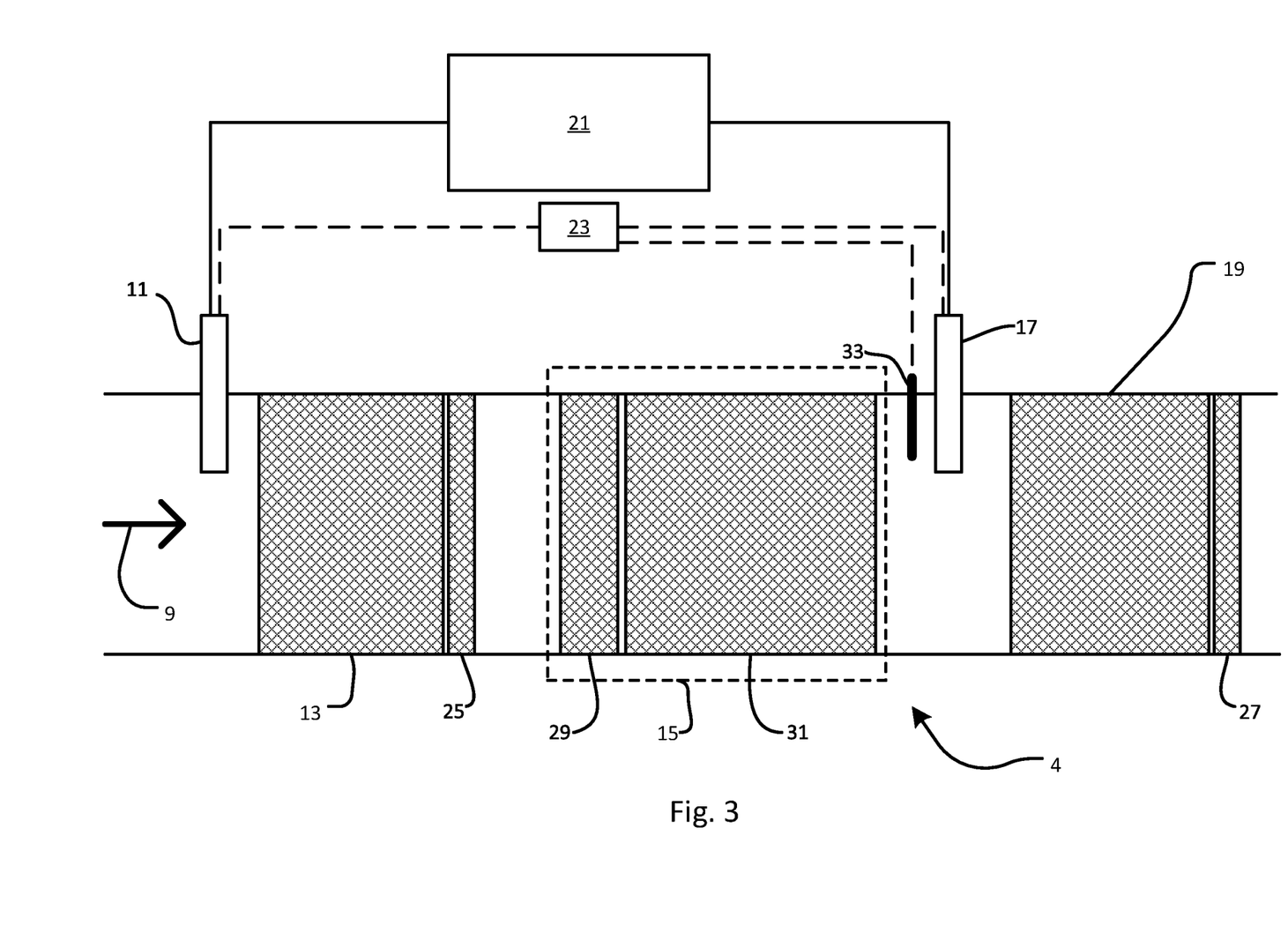
FIG. 3 schematically illustrates another embodiment of an exhaust gas aftertreatment system according to the invention.

FIG. 3 schematically illustrates another exemplifying embodiment of an exhaust gas aftertreatment system 4 according to the present invention. Here, ammonia slip catalysts 25 and 27 have been arranged immediately downstream of the SCR devices 13 and 19 respectively. The catalytic particulate filter arrangement 15 comprises an oxidation catalyst 29 immediately upstream of a non-catalytic particulate filter 31. Note however that combinations of an oxidation catalyst 29 with a catalysed filter 31 are also feasible and known in the art. A NOx sensor 33 is arranged downstream of the catalytic particulate filter arrangement 15 and upstream of the second dosing device 17. The NOx sensor is arranged in communication with ECU 23.

Figure 4A:
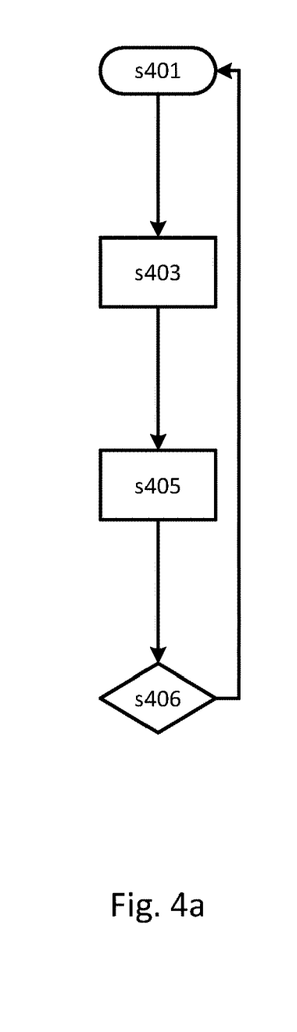
FIG. 4a is a flowchart schematically illustrating the method according to the invention.

FIG. 4a is a flowchart schematically illustrating the method according to the invention. Step s401 denotes the start of the method. In step s403 future exhaust conditions are estimated based upon predicted vehicle operating conditions. In step s405 a future NOx conversion demand is estimated based on the estimated future exhaust conditions. In step s406 reducing agent is dosed from the first reducing agent dosing device at a rate based at least on the estimated future NOx conversion demand. The method then reverts to the start, i.e. a continuous control loop is formed.

Figure 4B:
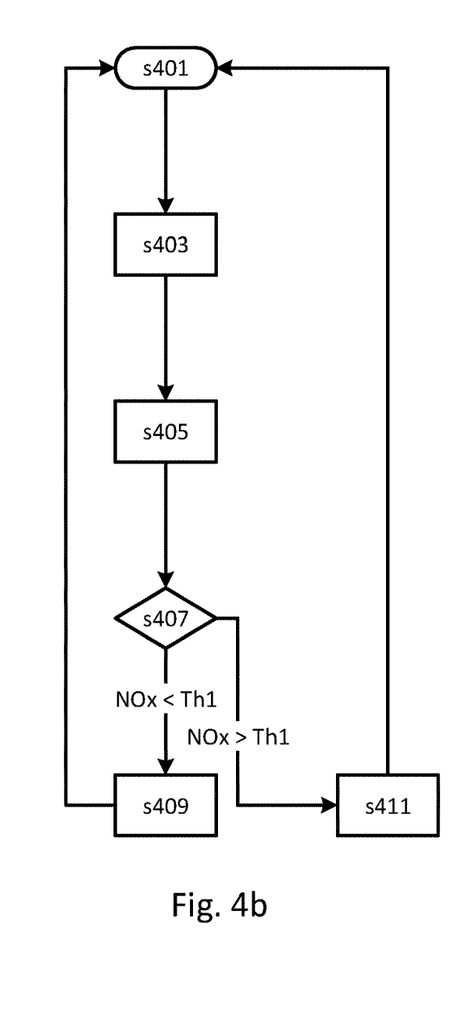
FIG. 4b is a flowchart schematically illustrating an embodiment of the method having an upper threshold limit.

FIG. 4b is a flowchart schematically illustrating an embodiment of the method according to the invention. Step s401 denotes the start of the method. In step s403 future exhaust conditions are estimated based upon predicted vehicle operating conditions. In step s405 a future NOx conversion demand is estimated based on the estimated future exhaust conditions. In step s407 the estimated future NOx conversion demand (NOx) is compared with a predetermined first threshold limit (Th1) for NOx conversion demand. This determines the dosing of reducing agent from the first reducing agent dosing device. In this present case the first threshold limit is an upper threshold limit. If the estimated future NOx conversion demand (NOx) is lower than the first threshold limit (Th1) then the reducing agent is dosed at a predetermined baseline rate (s409). However, if the estimated future NOx conversion demand (NOx) is greater than the first threshold limit then the reducing agent is dosed at an elevated rate (s411). The method then reverts to the start, i.e. a continuous control loop is formed.

Figure 4C:
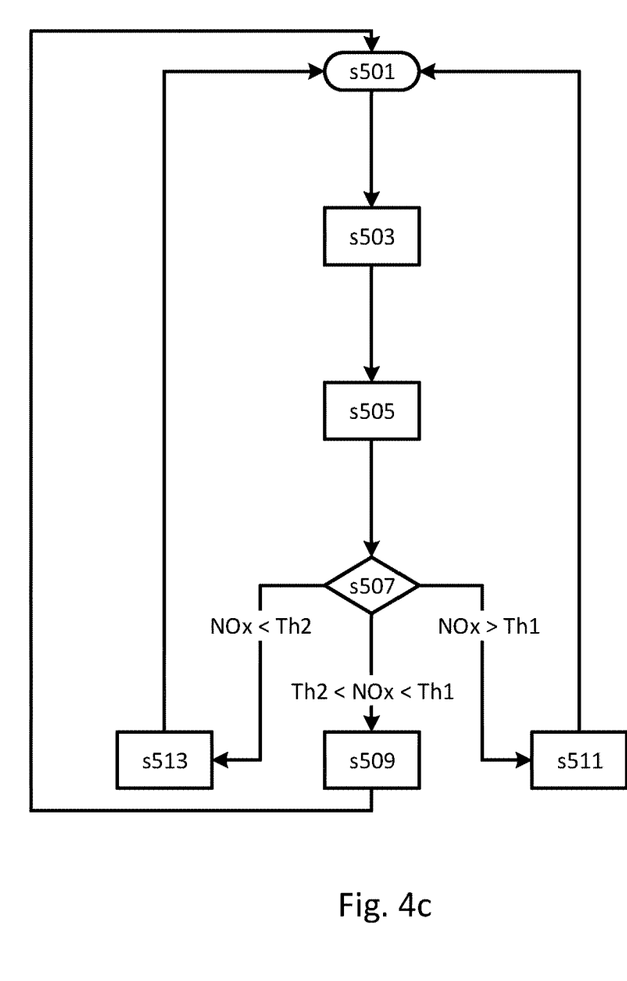
FIG. 4c is a flowchart schematically illustrating an embodiment of the method having upper and lower threshold limits.

FIG. 4c is a flowchart schematically illustrating an alternative embodiment of a method according to the invention. The method is analogous to that illustrated in FIG. 4b. However, in step s407 the estimated future NOx conversion demand (NOx) is compared with two separate thresholds for NOx conversion demand, an upper threshold limit (Th1) and a lower threshold limit (Th2). If the estimated future NOx conversion demand (NOx) is lower than the first threshold limit (Th1) and greater than the second threshold limit (Th2), then the reducing agent is dosed at a predetermined baseline rate (s409). However, If the estimated future NOx conversion demand (NOx) is lower than the second threshold limit (Th2), then the reducing agent is dosed at a lower rate (s413), and if the estimated future NOx conversion demand (NOx) is greater than the first threshold limit (Th1) then the reducing agent is dosed at an elevated rate (s411). The method then reverts to the start, i.e. a continuous control loop is formed.

Figure 5:
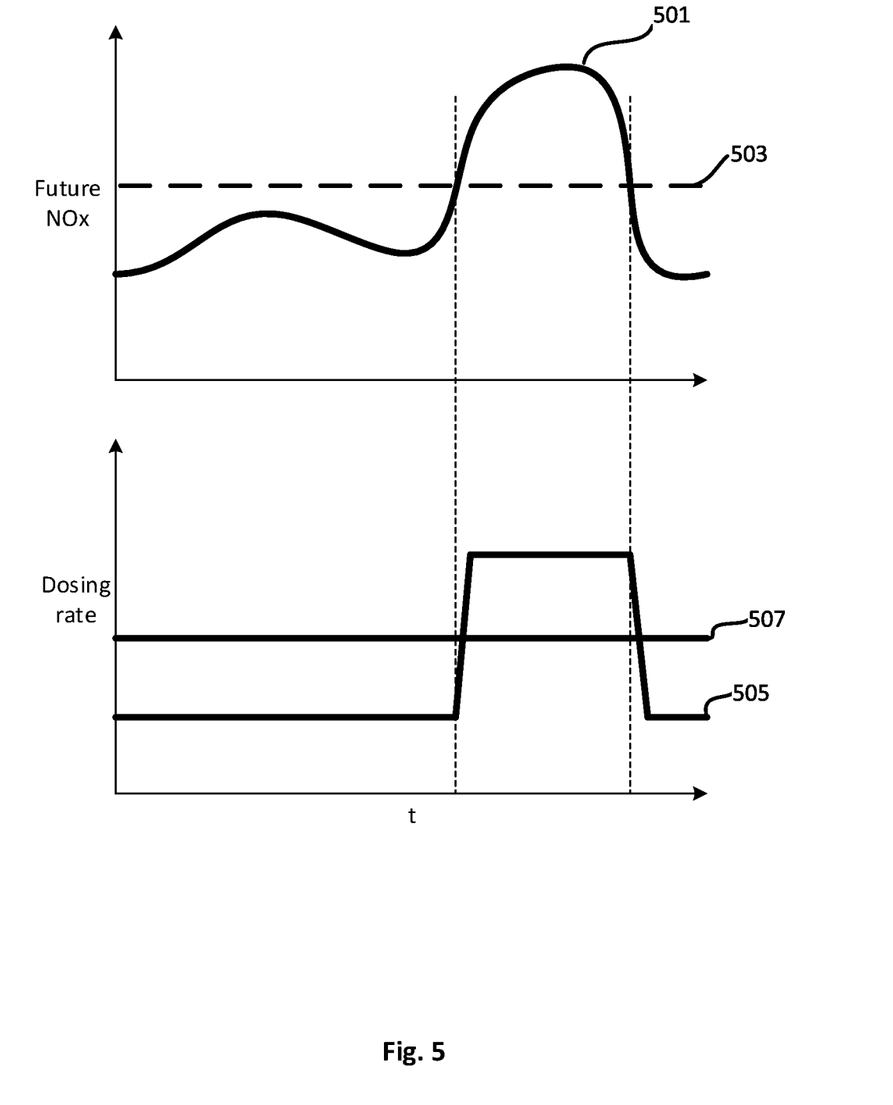
FIG. 5 schematically illustrates dosing from the reducing agent dosing devices according to an embodiment of the invention.

FIG. 5 schematically illustrates dosing from the reducing agent dosing devices according to an embodiment of the invention. The upper chart illustrates the estimated future NOx conversion demand (line 501) as a function of time. Line 503 represents a first (in this case upper) threshold limit. The lower chart illustrates the dosing rate from the first (line 505) and second (line 507) dosing devices as a function of time, wherein the timescale in both charts is the same. It can be seen that the estimated future NOx conversion demand may vary somewhat, depending on predicted vehicle operating conditions. As long as the estimated future NOx conversion (line 501) demand is below the threshold limit (line 503), then the first reducing agent dosing device doses reducing agent at a baseline rate. However, if the estimated future NOx conversion demand exceeds the threshold limit, then the dosing rate from the first dosing device (line 505) is adjusted to provide an adapted (in this case elevated) rate. Note that it may take some time for the dosing rate to reach the new adapted rate. Once the estimated future NOx conversion demand again falls below the threshold limit, the dosing rate from the first dosing device returns to the baseline rate. In this embodiment the dosing rate from the second dosing device (line 507) is illustrated as being constant. However, in accord with the invention, this dosing rate may also vary based on the estimated future NOx conversion demand, and/or based on output from a NOx sensor located in aftertreatment system.

Figure 6A:
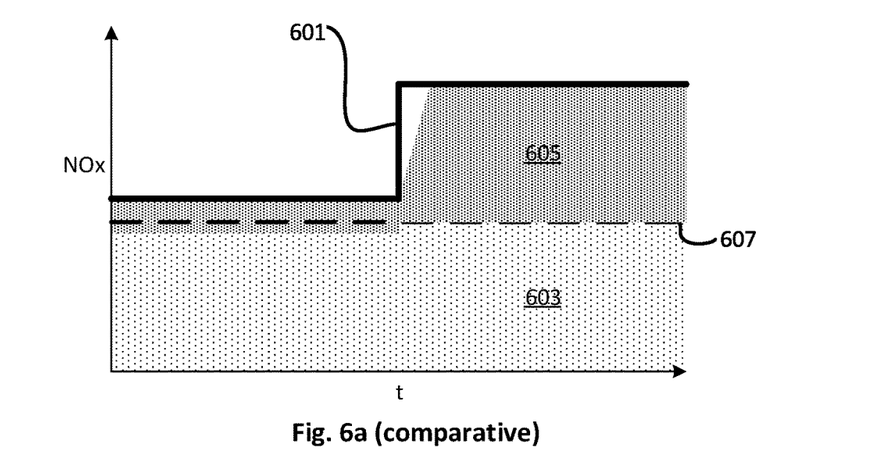
FIG. 6a schematically illustrates a comparative example whereby a non-inventive aftertreatment system is set up to allow passive regeneration of the cDPF.
Figure 6B:
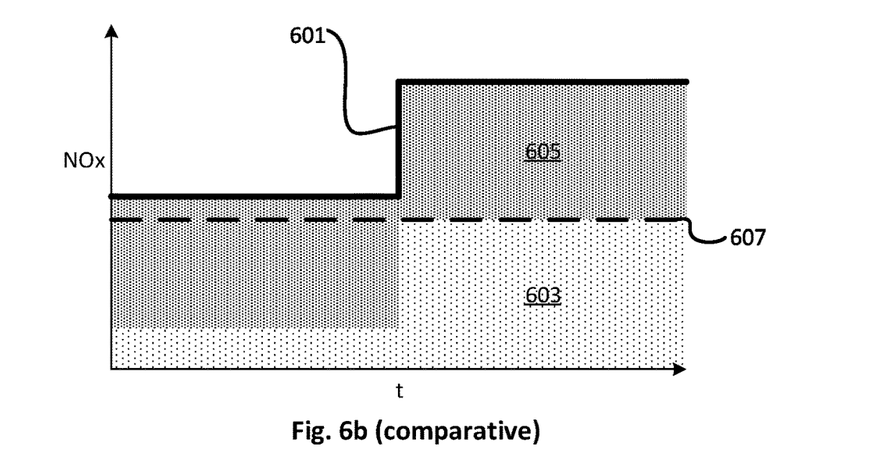
FIG. 6b schematically illustrates a comparative example whereby a non-inventive aftertreatment system is set up to allow maximal NOx conversion.
Figure 6C:
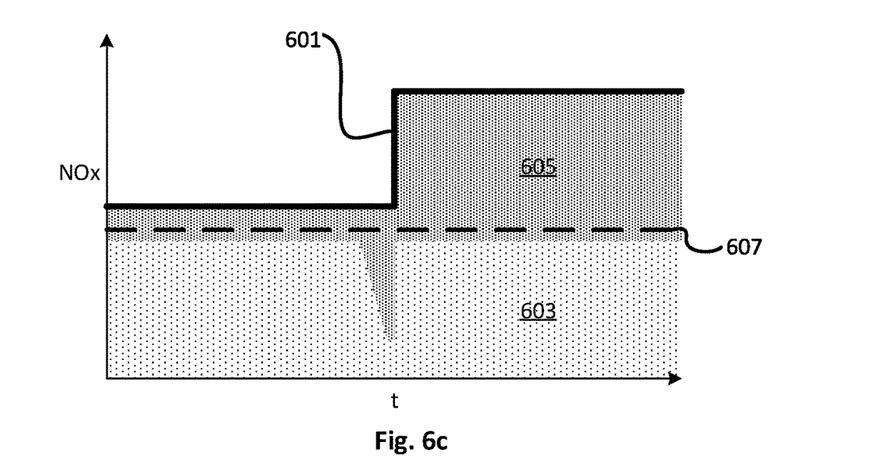
FIG. 6c schematically illustrates the operation of an exhaust aftertreatment device according to the invention.

FIGS. 6a-c are graphs schematically illustrating the effect of the present invention. The x-axes represent units of time, whereas the y-axes represent the NOx conversion demand of the exhaust aftertreatment system. FIGS. 6a and 6b are comparative examples illustrating a comparable aftertreatment system that does not utilize predicted vehicle operating conditions to control dosing from the first reducing agent dosing device. Line 601 illustrates total NOx conversion demand as a function of time. The lower shaded part of the graph 603 illustrates the contribution of the second SCR device to the total NOx conversion demand, whereas the upper shaded part of the graph 605 illustrates the contribution of the first SCR device to the total NOx conversion. Dotted line 607 illustrates the maximum contribution to the total NOx conversion demand that can be obtained from the second SCR device.

FIG. 6a illustrates a comparative example whereby a non-inventive aftertreatment system is set up to allow passive regeneration of the cDPF. The first SCR is initially operating at a fraction of its total capacity, allowing sufficient NOx to pass through to the cDPF to ensure passive regeneration. The second SCR device, operating at near maximum capacity converts substantially all NOx exiting the cDPF. However, in the event of a transient increase in total NOx conversion demand, it can be seen that it takes the first SCR a period of time to increase ammonia storage and thus ramp up conversion in order to tackle the increased NOx. The second SCR device, since it is operating at maximum capacity is unable to make up for the shortfall, and the result is that the total NOx conversion requirement may temporarily not be met.

FIG. 6b illustrates a comparative example whereby the first SCR device is continually operating at high capacity in order to ensure that any transiently increased demand in total NOx conversion may be met (assuming that the second SCR device is sufficiently responsive to the suddenly increased NOx conversion demand). However, in this example, there is insufficient NOx exiting the first SCR device in order to provide sufficient passive regeneration of the cDPF. The cDPF will therefore over time become obstructed by soot unless an energy-consuming active regeneration operation is performed.

FIG. 6c illustrates the operation of an exhaust aftertreatment device according to the invention. The upcoming transient increase in total NOx conversion requirement is predicted, and dosing from the first dosing device is increased in order to increase ammonia stored in the first SCR device and ramp up its NOx conversion capacity. The system is now ready to convert the rapid increase in NOx. It can be seen that for the most part a suitable amount of NOx passes beyond the first SCR device in order to provide passive regeneration. For a short period of time insufficient NOx passes the first SCR device to provide passive regeneration, but since the period is so short this is of negligible consequence. Thus it can be seen that a system according to the present invention is capable of meeting transient increases in total NOx conversion requirement while ensuring sufficient passive regeneration of the cDPF arrangement.

Figure 7:
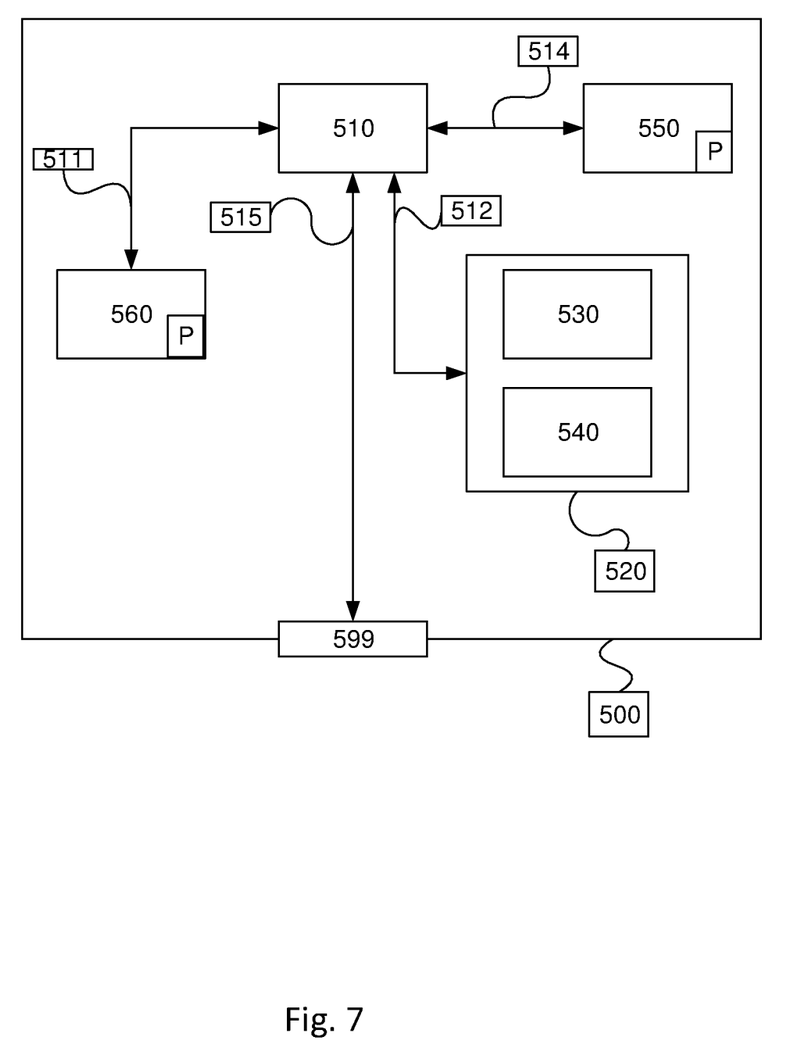
FIG. 7 schematically illustrates a device, such as a control unit.

FIG. 7 schematically illustrates a device 500. The control unit 23 described herein with reference to FIG. 2 and/or a computer may in a version comprise the device 500. The term "link" refers herein to a communication link which may be a physical connection such as an optoelectronic communication line, or a non-physical connection such as a wireless connection, e.g. a radio link or microwave link. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P which comprises routines for a method for controlling an exhaust gas aftertreatment system 4 according to the invention. The computer program P comprises routines for estimating future exhaust conditions based upon predicted vehicle operating conditions. The computer program P comprises routines for estimating a future NOx conversion demand based on the estimated future exhaust condition. The computer program comprises routines for dosing a reducing agent from the first reducing agent dosing device based at least on the estimated future NOx conversion demand. The computer program P may comprise routines for comparing the estimated future NOx conversion demand with a predetermined first threshold limit for NOx conversion demand. The computer program P may comprise routines for dosing a reducing agent from the first reducing agent dosing device, wherein if the estimated future NOx conversion demand is within the first threshold limit, then the reducing agent is dosed at a predetermined baseline rate and if the estimated future NOx conversion demand is beyond the first threshold limit, then the reducing agent is dosed at an adapted rate. The program P may be stored in an executable form or in a compressed form in a memory 560 and/or in a read/write memory 550.

Where the data processing unit 510 is described as performing a certain function, it means that the data processing unit 510 effects a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The invention claimed is:

1. A method for controlling an exhaust gas aftertreatment system, wherein the exhaust gas aftertreatment system comprises:
a first reducing agent dosing device;
a first selective catalytic reduction (SCR) device arranged downstream of the first reducing agent dosing device;
a catalytic particulate filter arrangement arranged downstream of the first SCR device, wherein the catalytic particulate filter arrangement comprises a catalysed particulate filter, or wherein the catalytic particulate filter arrangement comprises an oxidation catalyst and a particulate filter arranged downstream of the oxidation catalyst;
a second reducing agent dosing device arranged downstream of the catalytic particulate filter arrangement; and
a second selective catalytic reduction (SCR) device arranged downstream of the second reducing agent dosing device;
and wherein the method comprises the steps of:
estimating future exhaust conditions based upon predicted vehicle operating conditions;
estimating a future NOx conversion demand based on the estimated future exhaust conditions; and
dosing a reducing agent from the first reducing agent dosing device at a rate based at least on the estimated future NOx conversion demand, wherein the method further comprises the steps of:
comparing the estimated future NOx conversion demand with a predetermined upper threshold limit and a predetermined lower threshold limit for NOx conversion demand;
and dosing a reducing agent from the first reducing agent dosing device, wherein
if the estimated future NOx conversion demand is lower than the predetermined upper threshold limit and higher than the predetermined lower threshold limit, the reducing agent is dosed at a predetermined baseline rate; and
if the estimated future NOx conversion demand is higher than the predetermined upper threshold limit, the reducing agent is dosed at an elevated rate that is higher than the predetermined baseline rate; and
wherein
if the estimated future NOx conversion demand is lower than the predetermined lower threshold limit, then the reducing agent is dosed at a lower rate than the predetermined baseline rate.

2. The method according to claim 1, wherein
the predetermined baseline rate is adapted to correspond to from 20% to 60% of the estimated future NOx conversion demand; and/or
the elevated rate is adapted to correspond to from 60% to 90% of the estimated future NOx conversion demand; and/or
the lower rate is adapted to correspond to from 0% to 30% of the estimated future NOx conversion demand.

3. The method according to claim 1, wherein the elevated rate and/or the lower rate varies based at least partially on the estimated future NOx conversion demand.

4. The method according to claim 1, comprising dosing a reducing agent from the second reducing agent dosing device at a rate based at least partially on the estimated future NOx conversion demand.

5. The method according to claim 1, wherein the exhaust gas aftertreatment system further comprises a NOx sensor, and wherein the method comprises dosing a reducing agent from the first and/or second reducing agent dosing devices at a rate based at least partially on a value provided by the NOx sensor.

6. The method according to claim 1, wherein the predicted vehicle operating conditions are based on information from at least one of an engine management system of the internal combustion engine, a gearbox management system, a navigation system, a cruise control system and/or a radar system configured to determine traffic conditions.

7. A computer program (P), comprising program code for causing a control unit or a computer connected to the control unit to perform the method according to claim 1.

8. A computer-readable medium comprising instructions, which when executed by a control unit or a computer connected to the control unit cause the control unit or the computer to perform the method according to claim 1.

9. The method according to claim 1, wherein the elevated rate is at least 10% higher than the predetermined baseline rate.

10. The method according to claim 1, wherein the lower rate is at least 10% lower than the predetermined baseline rate.

11. An exhaust gas aftertreatment system comprising:
a first reducing agent dosing device;
a first selective catalytic reduction (SCR) device arranged downstream of the first reducing agent dosing device;
a catalytic particulate filter arrangement arranged downstream of the first SCR device, wherein the catalytic particulate filter arrangement comprises a catalysed particulate filter, or wherein the catalytic particulate filter arrangement comprises an oxidation catalyst and a particulate filter arranged downstream of the oxidation catalyst;
a second reducing agent dosing device arranged downstream of the catalytic particulate filter arrangement;
a second selective catalytic reduction (SCR) device arranged downstream of the second reducing agent dosing device;

a control unit arranged to estimate future exhaust conditions based upon predicted vehicle operating conditions; and the control unit arranged to estimate a future NOx conversion demand based on the estimated future exhaust conditions;

wherein the exhaust gas aftertreatment system is arranged to dose a reducing agent from the first reducing agent dosing device based at least on the estimated future NOx conversion demand;

the control unit arranged to compare the estimated future NOx conversion demand with a predetermined upper threshold limit for NOx conversion demand and a predetermined lower threshold limit for NOx conversion demand;

wherein the exhaust gas aftertreatment system is arranged to dose a reducing agent from the first reducing agent dosing device at a predetermined baseline rate if the estimated future NOx conversion demand is lower than the predetermined upper threshold limit and higher than the predetermined lower threshold limit; and wherein the exhaust gas aftertreatment system is arranged to dose the reducing agent from the first reducing agent dosing device at an elevated rate that is higher than the predetermined baseline rate if the estimated future NOx conversion demand is higher than the predetermined upper threshold limit; and wherein the exhaust gas aftertreatment system is arranged to dose the reducing agent from the first reducing agent dosing device at a lower rate than the predetermined baseline rate if the estimated future NOx conversion demand is lower than the predetermined lower threshold limit.

12. A vehicle comprising an internal combustion engine, wherein the vehicle further comprises an exhaust gas aftertreatment system according to claim 11.

* * * * *